(12) United States Patent
Attanasio et al.

(10) Patent No.: US 12,079,077 B2
(45) Date of Patent: Sep. 3, 2024

(54) DEVICE FAULT CONDITION REPORTING

(71) Applicant: Micron Technology, Inc., Boise, ID (US)

(72) Inventors: Crescenzo Attanasio, Acerra (IT); Carminantonio Manganelli, San Giorgio del Sannio (IT); Massimo Iaculo, San Marco Evangelista (IT); Paolo Papa, Naples (IT); Antonio Eliso, Boscoreale (IT)

(73) Assignee: Micron Technology, Inc., Boise, ID (US)

(*) Notice: Subject to any disclaimer, the term of this patent is extended or adjusted under 35 U.S.C. 154(b) by 50 days.

(21) Appl. No.: 17/645,180

(22) Filed: Dec. 20, 2021

(65) Prior Publication Data

US 2022/0237080 A1 Jul. 28, 2022

Related U.S. Application Data

(60) Provisional application No. 63/140,378, filed on Jan. 22, 2021.

(51) Int. Cl.
*G06F 11/00* (2006.01)
*G06F 3/06* (2006.01)
*G06F 11/07* (2006.01)
*G06F 11/10* (2006.01)

(52) U.S. Cl.
CPC ........ *G06F 11/1068* (2013.01); *G06F 3/0619* (2013.01); *G06F 3/0631* (2013.01); *G06F 3/0656* (2013.01); *G06F 3/0679* (2013.01); *G06F 11/0757* (2013.01); *G06F 11/0772* (2013.01)

(58) Field of Classification Search
CPC ............. G06F 11/1068; G06F 11/0757; G06F 11/0793; G06F 11/3656; G06F 11/079
See application file for complete search history.

(56) References Cited

U.S. PATENT DOCUMENTS

2019/0278651 A1* 9/2019 Thornley ............. G06F 11/0787
2020/0081631 A1* 3/2020 Schaefer ............... G06F 3/0673
2020/0387449 A1* 12/2020 Simionescu ............ G06F 3/061

* cited by examiner

*Primary Examiner* — Katherine Lin
(74) *Attorney, Agent, or Firm* — Holland & Hart LLP

(57) ABSTRACT

Methods, systems, and devices for device fault condition reporting are described. A host system may transmit, to a memory system, a command to perform an operation. The memory system may receive the command and identify a fault condition associated with performing the operation. The memory system may transmit, to the host system, a message that indicates the fault condition. After the memory system transmits the message, the memory system may enter a safe mode of operation based on identifying the fault condition.

23 Claims, 5 Drawing Sheets

| Message 300 |||||
|---|---|---|---|---|
| Header 305 | 0<br><br>xx10 000 1b | 1<br><br>Flags | 2<br><br>LUN | 3<br><br>Task Tag |
| | 4<br><br>IID \| Command Set Type | 5<br><br>Reserved | 6<br><br>Response | 7    code 325<br><br>Status |
| | 8<br><br>Total EHS Length | 9<br><br>Device Information | 10    (MSB) | 11    (LSB) |
| | | | Data Segment Length || 
| | 12    (MSB) | 13 | 14 | 15    (LSB) |
| | Transfer Count 310 ||||
| Fault Information 315 | 16 | 17 | 18 | 19 |
| | Reserved ||||
| | 20 | 21 | 22 | 23 |
| | Reserved ||||
| Specific Fault Information 320 | 24 | 25 | 26 | 27 |
| | Reserved ||||
| | 28 | 29 | 30 | 31 |
| | Reserved ||||
| | Header E2ECRC (omit HE=0) ||||
| | k    (MSB) | k+1    (LSB) | k+2 | k+3 |
| | Sense Data Length || Sense Data[0] | Sense Data[1] |
| | . . . | . . . | . . . | . . . |
| | k+16 | k+17 | k+18 | k+19 |
| | Sense Data[14] | Sense Data[15] | Sense Data[16] | Sense Data[17] |
| | Header E2ECRC (omit DD=0) ||||

FIG. 3

DEVICE FAULT CONDITION REPORTING

CROSS REFERENCE

The present Application for Patent claims the benefit of U.S. Provisional Patent Application No. 63/140,378 by ATTANASIO et al., entitled "DEVICE FAULT CONDITION REPORTING," filed Jan. 22, 2021, assigned to the assignee hereof, and expressly incorporated by reference herein.

FIELD OF TECHNOLOGY

The following relates generally to one or more systems for memory and more specifically to device fault condition reporting.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

BRIEF DESCRIPTION OF THE DRAWINGS

FIG. 3 illustrates an example of a message that supports device fault condition reporting in accordance with examples as disclosed herein.

DETAILED DESCRIPTION

Figure 1:
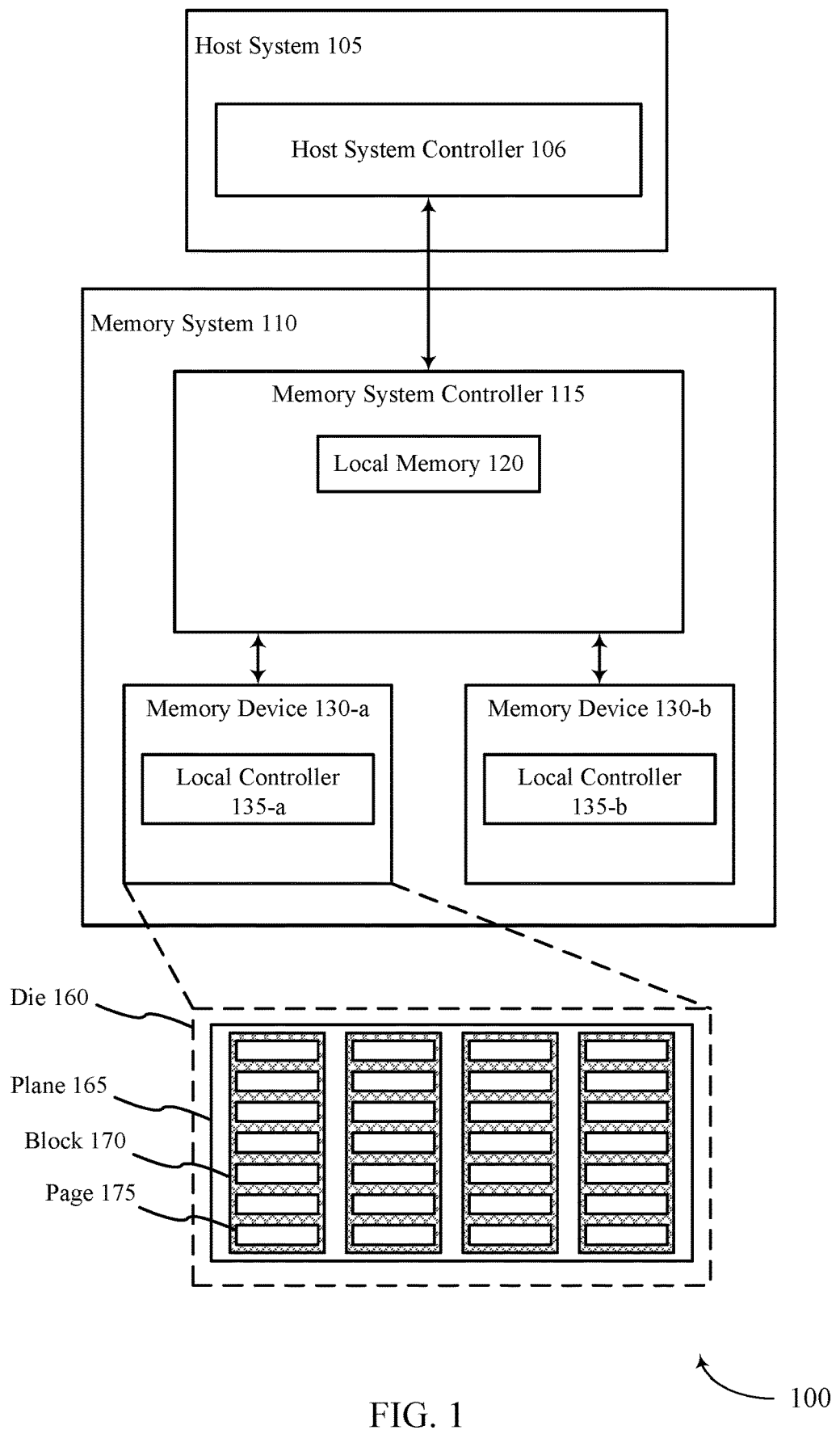
FIG. 1 illustrates an example of a system that supports device fault condition reporting in accordance with examples as disclosed herein.

A memory system may experience a fault condition associated with performing an operation of the memory system. When the fault condition occurs, the software or firmware (or hardware) of the memory system may cease functioning as expected (or may be hung-up). If the memory system goes for a period of time without performing expected functions, the host system may identify a time-out condition of the memory system and request a reset of the memory system. For example, the fault condition (e.g., a message indicating the fault condition) may not be communicated to the host system, but rather the host system may perform a system check on the memory system. Once the time-out condition occurs, the host system may perform remedial operations (e.g., perform a power cycle to the memory system) to cure the fault condition that may ail the memory system. Performing system checks and remedial operations without identifying the fault condition may decrease the efficiency of the memory system, thereby decreasing the overall performance of the memory system.

Identifying fault conditions of the memory system without communicating the fault condition to the host system may increase the risk of hacking and other compromises to the system as a whole, which may have a variety of consequences including theft of information from the system, failure of various sub-systems of the system, increasing the power consumption, decreasing the efficiency and start-up time of performing operations, and decreasing the overall performance of the memory system. For example, the host system may be unresponsive or unaware of the status (e.g., state) of the memory system, which may allow the memory system to continue performing operations after the fault condition occurs. Such cases may pose a threat to the security and safety of the memory system.

Systems, devices, and techniques are described to improve security and safety of the memory system, thereby improving the overall efficiency and operations of the memory system that identifies and communicates a fault condition. In some memory systems, efficiency may be improved by providing a real-time update (e.g., message) to the host system upon detecting the fault condition, thereby avoiding a time-out condition where the host system may check the memory system for errors and further avoiding an intervention action on the host platform. The memory system may generate the message to indicate that the fault condition occurred, a type of fault condition, and other information associated with the fault condition.

After the message is communicated to the host system, the memory system may enter a safe mode of operation. The safe mode of operation may prevent the memory system from performing operations while a fault condition is detected or occurring. In some examples, transmitting the message (e.g., fault report) to the host system and entering the safe mode of operation may increase the reliability and security of the memory system, thereby allowing the memory system or other components to perform operations at improved speeds, efficiency, and performance.

Features of the disclosure are initially described in the context of systems as described with reference to FIG. 1. Features of the disclosure are described in the context a process flow and message as described with reference to FIGS. 2-3. These and other features of the disclosure are further illustrated by and described with reference to an apparatus diagram and a flowchart that relate to device fault condition reporting as described with reference to FIGS. 4-5.

FIG. 1 illustrates an example of a system 100 that supports device fault condition reporting in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support device fault condition reporting. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, the host system 105 may transmit, to the memory system 110, a command to perform an operation. The memory system 110 may receive the command and identify a fault condition associated with performing the operation. In some cases, the memory system 110 may generate a message that indicates the fault condition. The message may also include a code associated with the fault condition that signals to the host system 105 that the fault condition occurred. For example, the memory system 110 may detect an internal fault condition and provide detailed information (e.g., included in the message) to the host system 105. In such cases, the memory system 110 may transmit, to the host system 105, the message. After the memory system 110 transmits the message, the memory system 110 may enter a safe mode of operation based on identifying the fault condition.

Figure 2:
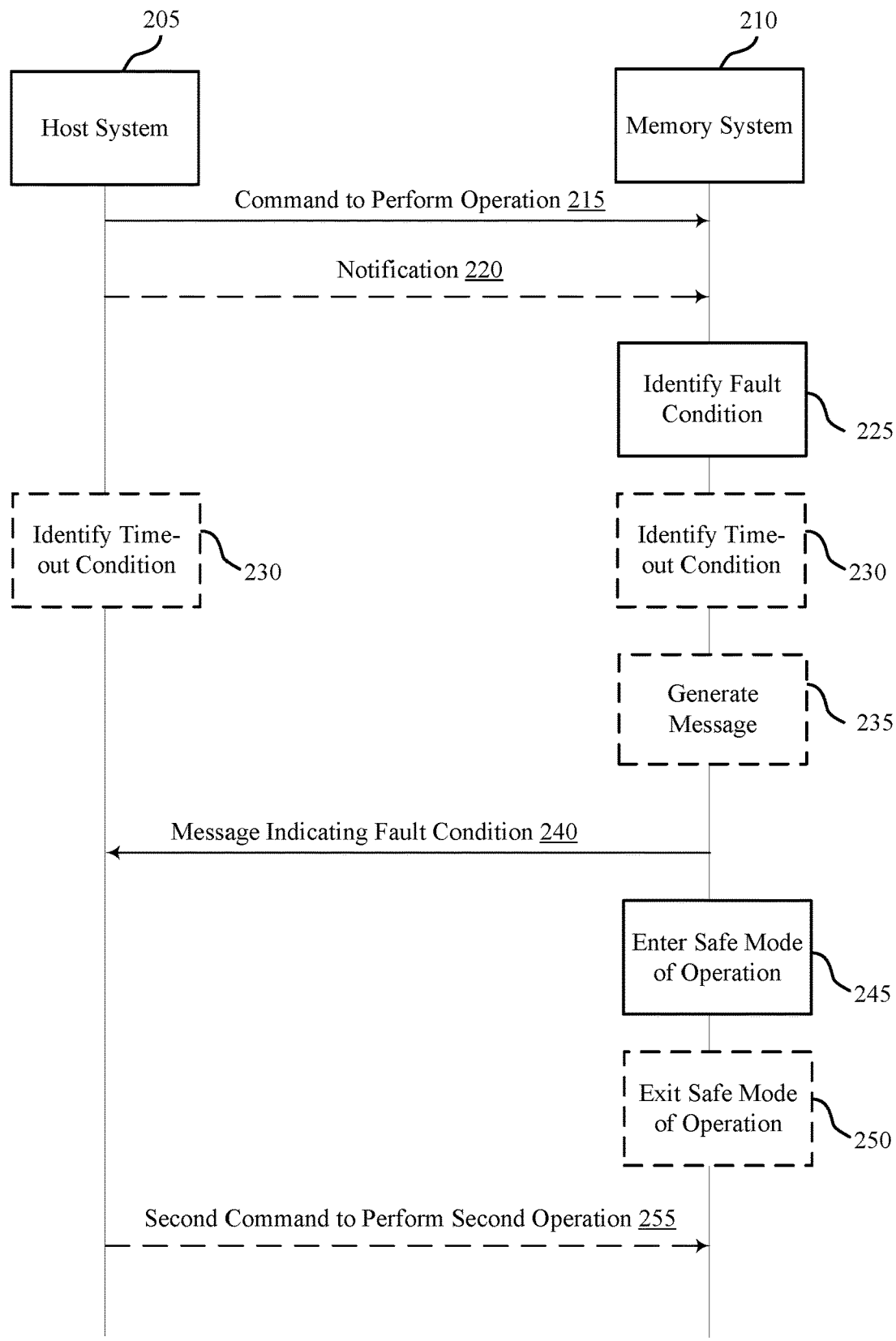
FIG. 2 illustrates an example of a flow diagram that supports device fault condition reporting in accordance with examples as disclosed herein.

FIG. 2 illustrates an example of a flow diagram 200 that supports device fault condition reporting in accordance with examples as disclosed herein. Flow diagram 200 may include host system 205 and memory system 210, which may be respective examples of a host system 105 and memory system 110 as described in reference to FIG. 1. Alternative examples of the following may be implemented, where some steps are performed in a different order or not at all. Some steps may additionally include additional features not mentioned below. The flow diagram 200 illustrates techniques where a host system 205 communicates fault conditions to the memory system 210.

Aspects of the flow diagram 200 may be implemented by a controller, among other components. Additionally or alternatively, aspects of the flow diagram 200 may be implemented as instructions stored in memory (e.g., firmware stored in a memory coupled with the memory system 210). For example, the instructions, when executed by a controller (e.g., the memory system controller 115), may cause the controller to perform the operations of the flow diagram 200.

A challenge with some memory systems is when the memory system becomes unresponsive to a host system. When the memory system because unresponsive, the host system may implement time-out operations (e.g., a reset operation or a power cycle) to reset the memory system and continue with normal operations. Memory systems may become unresponsive for a variety of reasons that may include the firmware being stuck, a hardware exception occurring, a critical operating condition of the memory system, or a fatal error in the memory system or a combination thereof.

For some fault conditions, the memory system may be configured to communicate information about the fault to the host system. In such examples, remedial operations or changes to the other operations may be implemented to fix the problem of the memory system or help the memory system avoid future problems that may be similar. In some examples, however, there may be a set of fault conditions for which the memory system may not be configured to communicate information to the host system (e.g., firmware being stuck, a hardware exception occurring, a critical operating condition of the memory system, or a fatal error in the memory system or a combination thereof). Techniques are provided for communicating information about some fault conditions to the host system from the memory system. In some examples, a message (e.g., a UPIU message) may be configured to include an indication that a fault condition has occurred and has information about the fault condition.

At 215, a command to perform an operation may be transmitted. For example, the host system 205 may transmit, to the memory system 210, the command to perform the operation. The operation may be an example of a write operation, a read operation, a reset operation, an erase operation, a flush operation, or a combination thereof. In such cases, the command may be an example of a write command, a read command, a cache command, a reset command, an erase command, a flush command, or a combination thereof.

In some cases, at 220, a notification may be transmitted. For example, the host system 205 may transmit, to the memory system 210, the notification. Prior to transmitting the notification, the memory system 210 may deallocate buffer resources associated with data from the host system 205. The host system 205 may then transmit, to the memory system 210, the notification associated with the buffer resource. In such cases, the memory system 210 may receive the notification based on in response to deallocating the buffer resources.

At 225, a fault condition may be identified. For example, the memory system 210 may identify the fault condition associated with performing the operation based on (e.g., in response to) receiving the command. The fault condition may be an example of a hardware exception associated with the memory system 210, a stuck condition of firmware of the memory system 210, an operating condition of the memory system 210 that satisfies a threshold, an error associated with the memory system 210, or a combination thereof. For example, the operating condition of the memory system 210 may be above or below the threshold. In some cases, the fault condition may be an example of a capacity operation of the memory system 210, a resource limitation of the memory system 210, a background operation, a temperature detection operation, a flush operation, or a combination thereof. For example, the temperature detection operation may detect a temperature that is above or below a threshold.

The memory system 210 may detect the fault condition and identify information associated with the fault condition in response to identifying the fault condition. The information associated with the fault condition may include a time at which the fault condition occurred, a duration of the fault condition, a temperature of the memory system 210, or a combination thereof. In such cases, the memory system 210 may detect the fault condition and detect additional information associated with the fault condition (i.e., temperature, time, duration) to transmit additional information to the host system 205.

In some case, the memory system 210 may store the fault condition and information associated with the fault condition in a shared memory (e.g., SRAM) associated with the memory system 210 in response to identifying the fault condition. In some examples, the fault condition and information associated with the fault condition may be stored in a panic log that may be used for an off-line debug operation.

At 230, a time-out condition may be identified. In some examples, the host system 205 may identify the time-out condition in response to having the memory system 210 fail to perform at least some expected action for duration of time (e.g., a time-out timer expires). For example, the host system 205 may not receive a message (e.g., response) from the memory system 210 within a duration of time, and the host system 205 may determine that the memory system 210 may be having problems or has experienced a fault condition. In some cases, the time-out condition may occur independently of identifying whether the memory system identifies a fault condition. In some examples, a host system 205 may maintain a time-out timer that may be reset after one or more operations occur. Thus, during normal operation of the memory system, the time-out timer may not expire because it is getting reset fairly frequently. If the time-out timer fails to get reset, upon expiration of the timer (e.g., the time-out condition), the host system 105 may issue a command for the memory system 210 to be reset or be power cycled. In some examples, the memory system 210 may identify the time-out condition in response to identifying the fault condition.

After the time-out condition occurs, the host system 205 may perform remedial measures (e.g., perform a power cycle on the memory system 210) to address the conditions that impede the performance of the memory system 210. However, the host system 205 may be unaware of the conditions that occurred to cause the time-out condition. In some cases, the fault condition may not be communicated to the host system 205 but rather the host system 205 may perform the time-out condition (e.g., a power cycle) to refresh the memory system 210 and perform a recovery procedure on the memory system 210.

At 235, a message may be generated. For example, the memory system 210 may generate the message that indicates the fault condition in response to identifying the fault condition. In some cases, the memory system 210 may generate a code associated with the fault condition that signals to the host system 205 that the fault condition occurred. The message may include a field that includes the code and one or more fields that include one or more bits that indicate the information associated with the fault condition (e.g., generic fault information and specific fault information).

At 240, the message may be transmitted. For example, the memory system 210 may transmit the message indicating the fault condition. In such cases, the host system 205 may receive, from the memory system 210, the message that indicates the fault condition. In some cases, the memory system 210 may transmit the message in response to receiving a command. In other examples, the memory system 210 may refrain from transmitting the message in response to receiving a vendor command.

At 245, a safe mode of operation may be entered. In some examples, the memory system 210 may enter the safe mode of operation in response to transmitting the message and identifying the fault condition. In some examples, the memory system 210 may enter the safe mode of operation before transmitting the message and identifying the fault condition. The safe mode of operation may be an example of a period of time that the memory system 210 may refrain from performing an operation. In such cases, the operation capabilities of the memory system 210 may be restricted. For example, the memory system 210 may refrain from performing the operation in response to entering the safe mode of operation. For example, the firmware of the memory system 210 may enter the safe mode of operation after the message indicating the fault condition may be transmitted to the host system 205.

At 250, the safe mode may be exited. For example, the memory system 210 may exit the safe mode of operation after a duration of time expires. In some cases, the memory system 210 may exit the safe mode in response to the memory system 210 entering a power cycle. For example, the host system 205 may remove the power supply from the memory system 210, thereby initiating a power cycle within the memory system 210.

At 255, a second command may be transmitted. For example, the host system 205 may transmit a second command system for the memory system 210 to perform a second operation. In such cases, The memory system 210 may receive the second command in response to the memory system 210 exiting the safe mode of operation. The second command system may be an example of a write command, a read command, a cache command, a reset command, an erase command, a flush command, or a combination thereof.

By the memory system 210 generating and transmitting the message that indicates the fault condition in real-time (e.g., at the time that the fault condition occurs), the memory system 210 may avoid the host system 205 initiating the time-out condition and performing an intervention action. In some cases, providing real-time fault condition reporting may reduce test firmware releases to detect error conditions and allow a safe state (e.g., safe mode of operation) for the host system 205 to communicate with the memory system 210 in case a fault condition occurred. In such cases, transmitting the message to the host system 205 may accelerate the failure analysis to identify the causes of the fault condition, thereby allowing the memory system 210 to quickly address the fault condition and prevent future fault conditions from occurring.

FIG. 3 illustrates an example of a message 300 that supports device fault condition reporting in accordance with examples as disclosed herein. The message 300 may be an example of the message as described in reference to FIGS. 1 and 2. The message may include a header 305, a transfer count 310, fault information 315, and specific fault information 320. The header may include code 325 which may be an example of the code as described in reference to FIGS. 1 and 2.

The message 300 may include information indicating the command received from the host system and device level status resulting from the execution of the command. The memory system may transmit the message 300, to the host system, after the operation is completed. In some cases, the message 300 may indicate an identified fault condition. In such cases, the memory system may modify the header 305 (e.g., code 325), fault information 315, and specific fault information 320 to communicate the fault condition to the host system. In some cases, the message 300 may be an example of a UFS Protocol Information Unit (UPIU). In some cases, the message 300 may be an example of a response UPIU sent from a memory system to a host system.

The header 305 may include the first twelve bytes of the message 300. Each numbered box in the message 300 represents a byte of information that includes a plurality of bits. In some examples, the header 305 may include a transaction type, a flag, a memory system identification (ID), a command set type, a response, a status, a task tag, memory system information, and a data segment length. The status may be included in the seventh byte of the message 300 and may be an example of a reserved operating code (OPCODE) for the fault condition. In such cases, the status may be an example of the code 325. The code 325 may be associated with the fault condition and signal to the host system that the fault condition occurred. In such cases, the memory system may generate the code 325 to indicate that the fault condition occurred.

The message 300 may include the transfer count 310. The transfer count 310 may indicate a quantity of bytes that may not be transferred from/to the memory system. The message 300 may also include the fault information 315. The fault information 315 may include bits of information associated with the fault condition. The fault information 315 may include bytes 16 through 23 of the message 300. For example, the fault information 315 may indicate what type of fault condition occurred, the ID of the fault condition, or both. Byte 16 included in the fault information 315 may indicate an ID of the stuck condition of the firmware of the memory system, and byte 17 included in the fault information 315 may indicate an ID of the hardware exception associated with the memory system. Byte 18 included in the fault information 315 may indicate an ID of an operating condition (e.g., critical operating condition) of the memory system, and byte 19 included in the fault information 315 may indicate an ID of an error associated with the memory system. Bytes 20 through 23 may indicate an ID of an assert. In some cases, the fault information 315 may indicate a capacity operation of the memory system, a resource limitation of the memory system, a background operation, a temperature detection operation, a flush operation, or a combination thereof.

The message 300 may include specific fault information 320. The specific fault information 320 may include bits of information associated with the fault condition. In some cases, the specific fault information 320 may include bytes 24 through 31 of the message 300. In some cases, the specific fault information 320 may include bytes 24 through N of the message 300, where N is greater than 31. The specific fault information 320 may include a time at which the fault condition occurred, a duration of the fault condition, a temperature of the memory system, or a combination thereof. The memory system may identify the fault condition and generate the message 300 in response to identifying the fault condition. In such cases, the memory system may generate the code 325 and fault information 315. In response to generating the code 325 and the fault information 315, the memory system may generate the specific fault information 320 based on identifying the information associated with the fault condition.

The specific fault information 320 may be associated with a particular fault condition of the memory system. For example, byte 16 may indicate that the fault condition is a stuck condition of the firmware, and the specific fault information 320 may include data associated with the firmware. The memory system may identify in byte 17 that the fault condition is a hardware exception, and the specific fault information 320 may include a hardware status register dump. The memory system may identify in byte 18 that the fault condition is an operating condition that may be above or below a threshold, and the specific fault information 320 may include information associated with the temperature, power supply, or both. The memory system may identify in byte 19 that the fault condition is an error associated with the memory system, and the specific fault information 320 may include a central processing unit (CPU) dump.

In one example, the fault condition may be a hardware exception. In such cases, the host system may issue a write command. The front end of the memory system may allocate buffer resources for data from the host system. The data may then be transferred from the memory system and to the host system. The firmware may deallocate the buffer resources prior to transmitting the message to the host system. In such cases, the memory system may identify the fault condition (e.g., the hardware exception). For example, the firmware receives the exception notification indicating the hardware exception, and the memory system generates the message 300 (e.g., including the code 325, with the fault information 315, and the specific fault information 320). The message 300 may indicate the code 325, a buffer resource release error ID in byte 17 of the fault information 315, and the specific fault information 320. The specific fault information 320 may include an indication of a failed buffer ID, a last allocated buffer chain, an interrupt status register of hardware peripheral, and information associated with the firmware. The memory system may transmit the message 300 to the host system in response to generating the message 300.

In another example, the fault condition may be a stuck condition of the firmware. In such cases, the host system may issue a sync cache command. The front end of the memory system may transmit a program request to the back end for a cache flush. The firmware may wait until the completion of a cache flush, however; the backend may experience a stuck condition. In such cases, the memory system may identify the fault condition (e.g., the stuck condition). The hardware may detect (e.g., identify) the time-out condition and notify the firmware of the stuck condition. For example, the firmware receives the notification indicating the stuck condition, and the memory system generates the message 300 (e.g., including the code 325, with the fault information 315, and the specific fault information 320). The message 300 may indicate the code 325, a program operation time-out ID in byte 16 of the fault information 315, and the specific fault information 320. The specific fault information 320 may include information associated with the front end and back end modules, shared memory (e.g., SRAM), and hardware register dumps. The memory system may transmit the message 300 to the host system based on generating the message 300.

Figure 4:
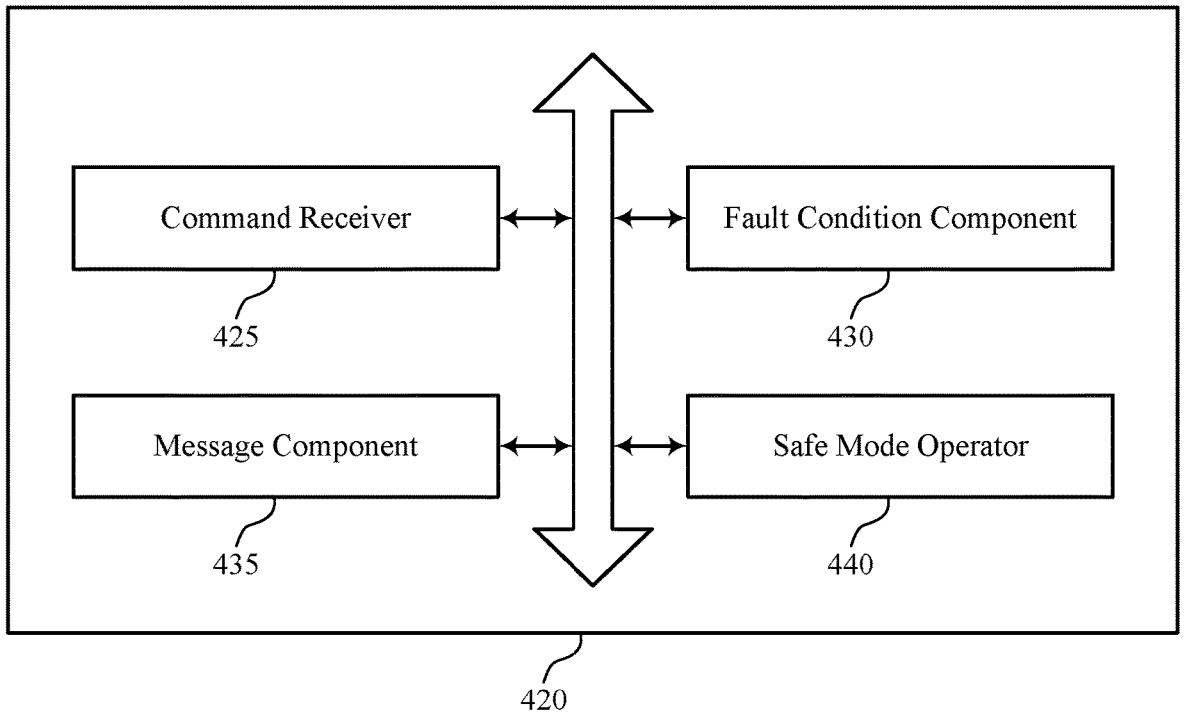
FIG. 4 shows a block diagram of a memory system that supports device fault condition reporting in accordance with examples as disclosed herein.

FIG. 4 shows a block diagram 400 of a memory system 420 that supports device fault condition reporting in accordance with examples as disclosed herein. The memory system 420 may be an example of aspects of a memory system as described with reference to FIGS. 1 through 3. The memory system 420, or various components thereof, may be an example of means for performing various aspects of device fault condition reporting as described herein. For example, the memory system 420 may include a command receiver 425, a fault condition component 430, a message component 435, a safe mode operator 440, or any combination thereof. Each of these components may communicate, directly or indirectly, with one another (e.g., via one or more buses).

The command receiver 425 may be configured as or otherwise support a means for receiving, from a host system, a command for the memory system to perform an operation. The fault condition component 430 may be configured as or otherwise support a means for identifying a fault condition of the memory system associated with performing the operation based at least in part on receiving the command. The message component 435 may be configured as or otherwise support a means for transmitting, to the host system, a message that indicates the fault condition based at least in part on identifying the fault condition. The safe mode operator 440 may be configured as or otherwise support a means for entering, by the memory system, a safe mode of operation based at least in part on identifying the fault condition.

In some examples, the message component 435 may be configured as or otherwise support a means for generating the message that indicates the fault condition based at least in part on identifying the fault condition, where transmitting the message is based at least in part on generating the message.

In some examples, the message component 435 may be configured as or otherwise support a means for generating a code associated with the fault condition that signals to the host system that the fault condition occurred based at least in part on identifying the fault condition, where the message includes the code.

In some examples, the fault condition component 430 may be configured as or otherwise support a means for identifying information associated with the fault condition based at least in part on identifying the fault condition, where the message includes one or more bits that indicate the information associated with the fault condition.

In some examples, the information associated with the fault condition includes a time at which the fault condition occurred, a duration of the fault condition, a temperature of the memory system, or a combination thereof.

In some examples, the fault condition component 430 may be configured as or otherwise support a means for identifying a time-out condition based at least in part on identifying the fault condition, where transmitting the message is based at least in part on identifying the time-out condition.

In some examples, the fault condition component 430 may be configured as or otherwise support a means for deallocating buffer resources associated with data from the host system. In some examples, the fault condition component 430 may be configured as or otherwise support a means for receiving a notification based at least in part on deallocating the buffer resources, where identifying the fault condition is based at least in part on receiving the notification.

In some examples, the fault condition component 430 may be configured as or otherwise support a means for storing the fault condition and information associated with the fault condition in a shared memory associated with the memory system based at least in part on identifying the fault condition.

In some examples, the safe mode operator 440 may be configured as or otherwise support a means for exiting the safe mode of operation after a duration of time expires. In some examples, the command receiver 425 may be configured as or otherwise support a means for receiving, from the host system, a second command system to perform a second operation based at least in part on exiting the safe mode of operation.

In some examples, the safe mode operator 440 may be configured as or otherwise support a means for refraining from performing the operation based at least in part on entering the safe mode of operation.

In some examples, the command is a write command, a cache command, a read command, or a combination thereof.

In some examples, the fault condition includes a hardware exception associated with the apparatus, a stuck condition of firmware of the apparatus, an operating condition of the apparatus that satisfies a threshold, a capacity operation of the apparatus, a resource limitation of the apparatus, a background operation, a temperature detection operation, a flush operation, or a combination thereof.

Figure 5:
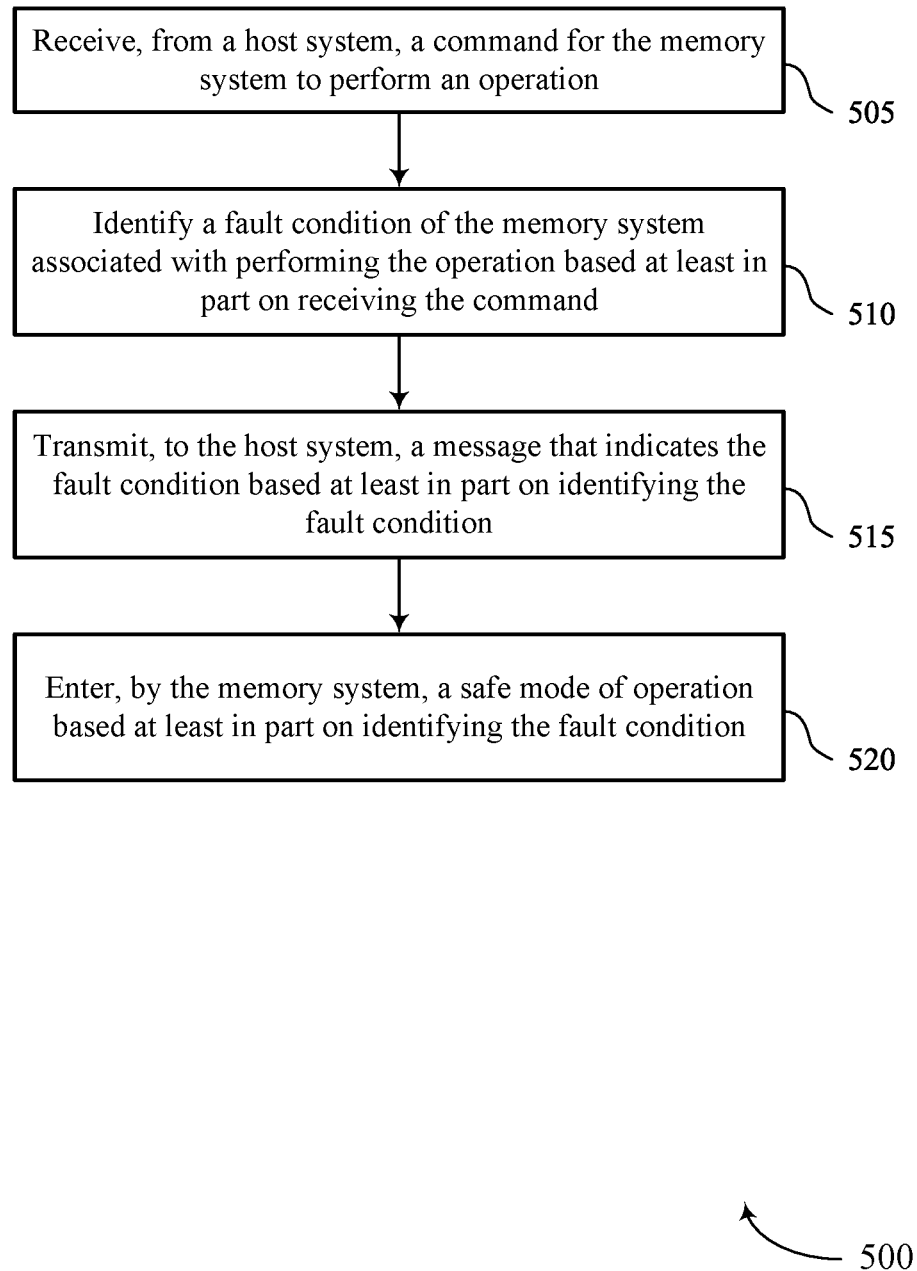
FIG. 5 shows a flowchart illustrating a method or methods that support device fault condition reporting in accordance with examples as disclosed herein.

FIG. 5 shows a flowchart illustrating a method 500 that supports device fault condition reporting in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

Aspects of the method 500 may be implemented by a controller, among other components. Additionally or alternatively, aspects of the method 500 may be implemented as instructions stored in memory (e.g., firmware stored in a memory coupled with the memory system 110). For example, the instructions, when executed by a controller (e.g., the memory system controller 115), may cause the controller to perform the operations of method 500.

At 505, a command may be received. The method may include receiving, from a host system, the command for the memory system to perform an operation. The operations of 505 may be performed in accordance with examples as disclosed herein. In some examples, aspects of the operations of 505 may be performed by a command receiver 425 as described with reference to FIG. 4.

At 510, a fault condition may be identified. The method may include identifying the fault condition of the memory system associated with performing the operation based at least in part on receiving the command. The operations of 510 may be performed in accordance with examples as disclosed herein. In some examples, aspects of the operations of 510 may be performed by a fault condition component 430 as described with reference to FIG. 4.

At 515, a message may be transmitted. The method may include transmitting, to the host system, the message that indicates the fault condition based at least in part on identifying the fault condition. The operations of 515 may be performed in accordance with examples as disclosed herein. In some examples, aspects of the operations of 515 may be performed by a message component 435 as described with reference to FIG. 4.

At 520, a safe mode of operation may be entered. The method may include entering, by the memory system, the safe mode of operation based at least in part on identifying the fault condition. The operations of 520 may be performed in accordance with examples as disclosed herein. In some examples, aspects of the operations of 520 may be performed by a safe mode operator 440 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor) for receiving, from a host system, a command for the memory system to perform an operation, identifying a fault condition of the memory system associated with performing the operation based at least in part on receiving the command, transmitting, to the host system, a message that indicates the fault condition based at least in part on identifying the fault condition, and entering, by the memory system, a safe mode of operation based at least in part on identifying the fault condition.

Some examples of the method 500 and the apparatus described herein may further include operations, features, circuitry, logic, means, or instructions for generating the message that indicates the fault condition based at least in part on identifying the fault condition, where transmitting the message may be based at least in part on generating the message.

Some examples of the method 500 and the apparatus described herein may further include operations, features, circuitry, logic, means, or instructions for generating a code associated with the fault condition that signals to the host system that the fault condition occurred based at least in part on identifying the fault condition, where the message includes the code.

Some examples of the method 500 and the apparatus described herein may further include operations, features, circuitry, logic, means, or instructions for identifying information associated with the fault condition based at least in part on identifying the fault condition, where the message includes one or more bits that indicate the information associated with the fault condition.

In some examples of the method 500 and the apparatus described herein, the information associated with the fault condition includes a time at which the fault condition occurred, a duration of the fault condition, a temperature of the memory system, or a combination thereof.

Some examples of the method 500 and the apparatus described herein may further include operations, features, circuitry, logic, means, or instructions for identifying a time-out condition based at least in part on identifying the fault condition, where transmitting the message may be based at least in part on identifying the time-out condition.

Some examples of the method 500 and the apparatus described herein may further include operations, features, circuitry, logic, means, or instructions for deallocating buffer resources associated with data from the host system and receiving a notification based at least in part on deallocating the buffer resources, where identifying the fault condition may be based at least in part on receiving the notification.

Some examples of the method 500 and the apparatus described herein may further include operations, features, circuitry, logic, means, or instructions for storing the fault condition and information associated with the fault condition in a shared memory associated with the memory system based at least in part on identifying the fault condition.

Some examples of the method 500 and the apparatus described herein may further include operations, features, circuitry, logic, means, or instructions for exiting the safe mode of operation after a duration of time expires and receiving, from the host system, a second command system to perform a second operation based at least in part on exiting the safe mode of operation.

Some examples of the method 500 and the apparatus described herein may further include operations, features, circuitry, logic, means, or instructions for refraining from performing the operation based at least in part on entering the safe mode of operation.

In some examples of the method 500 and the apparatus described herein, the command may be a write command, a cache command, a read command, or a combination thereof.

In some examples of the method 500 and the apparatus described herein, the fault condition includes a hardware exception associated with the apparatus, a stuck condition of firmware of the apparatus, an operating condition of the apparatus that satisfies a threshold, a capacity operation of the apparatus, a resource limitation of the apparatus, a background operation, a temperature detection operation, a flush operation, or a combination thereof.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:
1. An apparatus, comprising:
   a memory device comprising one or more arrays of memory; and
   a control circuit coupled with the memory device and configured to cause the apparatus to:

receive, from a host system, a command to perform an operation on the one or more arrays of memory of the memory device;

deallocate buffer resources associated with data from the host system;

receive a notification based at least in part on deallocating the buffer resources;

identify, by the memory device, a fault condition of the memory device associated with performing the operation in response to receiving the command and based at least in part on receiving the notification;

transmit, from the memory device to the host system, a message that indicates the fault condition based at least in part on identifying the fault condition, wherein the message comprises an indication of the command; and enter a safe mode of operation based at least in part on identifying the fault condition.

2. The apparatus of claim 1, wherein the control circuit is further configured to cause the apparatus to:

generate the message that indicates the fault condition based at least in part on identifying the fault condition, wherein transmitting the message is based at least in part on generating the message.

3. The apparatus of claim 1, wherein the control circuit is further configured to cause the apparatus to:

generate a code associated with the fault condition that signals to the host system that the fault condition occurred based at least in part on identifying the fault condition, wherein the message comprises the code.

4. The apparatus of claim 1, wherein the control circuit is further configured to cause the apparatus to:

identify information associated with the fault condition based at least in part on identifying the fault condition, wherein the message comprises one or more bits that indicate the information associated with the fault condition.

5. The apparatus of claim 4, wherein the information associated with the fault condition comprises a time at which the fault condition occurred, a duration of the fault condition, a temperature of the apparatus, or a combination thereof.

6. The apparatus of claim 1, wherein the control circuit is further configured to cause the apparatus to:

identify a time-out condition based at least in part on identifying the fault condition, wherein transmitting the message is based at least in part on identifying the time-out condition.

7. The apparatus of claim 1, wherein the control circuit is further configured to cause the apparatus to:

store the fault condition and information associated with the fault condition in a shared memory associated with the apparatus based at least in part on identifying the fault condition.

8. The apparatus of claim 1, wherein the control circuit is further configured to cause the apparatus to:

exit the safe mode of operation after a duration of time expires; and receive, from the host system, a second command to perform a second operation on the one or more arrays of memory of the memory device based at least in part on exiting the safe mode of operation.

9. The apparatus of claim 1, wherein the control circuit is further configured to cause the apparatus to:

refrain from performing the operation based at least in part on entering the safe mode of operation.

10. The apparatus of claim 1, wherein the command is a write command, a cache command, a read command, or a combination thereof.

11. The apparatus of claim 1, wherein the fault condition comprises a hardware exception associated with the apparatus, a stuck condition of firmware of the apparatus, an operating condition of the apparatus that satisfies a threshold, a capacity operation of the apparatus, a resource limitation of the apparatus, a background operation, a temperature detection operation, a flush operation, or a combination thereof.

12. A non-transitory computer-readable medium storing code comprising instructions, which when executed by a processor of an electronic device, cause the electronic device to:

receive, from a host system, a command to perform an operation on one or more arrays of memory of a memory system;

deallocate buffer resources associated with data from the host system;

receive a notification based at least in part on deallocating the buffer resources;

identify, by the memory system, a fault condition of the memory system associated with performing the operation in response to receiving the command and based at least in part on receiving the notification;

transmit, from the memory system to the host system, a message that indicates the fault condition based at least in part on identifying the fault condition, wherein the message comprises an indication of the command; and enter a safe mode of operation based at least in part on identifying the fault condition.

13. The non-transitory computer-readable medium of claim 12, wherein the instructions, when executed by the processor of the electronic device, further cause the electronic device to:

generate the message that indicates the fault condition based at least in part on identifying the fault condition, wherein transmitting the message is based at least in part on generating the message.

14. The non-transitory computer-readable medium of claim 12, wherein the instructions, when executed by the processor of the electronic device, further cause the electronic device to:

generate a code associated with the fault condition that signals to the host system that the fault condition occurred based at least in part on identifying the fault condition, wherein the message comprises the code.

15. The non-transitory computer-readable medium of claim 12, wherein the instructions, when executed by the processor of the electronic device, further cause the electronic device to:

identify information associated with the fault condition based at least in part on identifying the fault condition, wherein the message comprises one or more bits that indicate the information associated with the fault condition.

16. The non-transitory computer-readable medium of claim 15, wherein the information associated with the fault condition comprises a time at which the fault condition occurred, a duration of the fault condition, a temperature of the memory system, or a combination thereof.

17. The non-transitory computer-readable medium of claim 12, wherein the instructions, when executed by the processor of the electronic device, further cause the electronic device to:

identify a time-out condition based at least in part on identifying the fault condition, wherein transmitting the message is based at least in part on identifying the time-out condition.

18. A method performed at a memory system, comprising:
receiving, from a host system, a command for the memory system to perform an operation on one or more arrays of memory of the memory system;
deallocating buffer resources associated with data from the host system;
receiving a notification based at least in part on deallocating the buffer resources;
identifying, by the memory system, a fault condition of the memory system associated with performing the operation in response to receiving the command and based at least in part on receiving the notification;
transmitting, from the memory system to the host system, a message that indicates the fault condition based at least in part on identifying the fault condition, wherein the message comprises an indication of the command; and
entering, by the memory system, a safe mode of operation based at least in part on identifying the fault condition.

19. The method of claim 18, further comprising:
generating the message that indicates the fault condition based at least in part on identifying the fault condition, wherein transmitting the message is based at least in part on generating the message.

20. The method of claim 18, further comprising:
generating a code associated with the fault condition that signals to the host system that the fault condition occurred based at least in part on identifying the fault condition, wherein the message comprises the code.

21. The method of claim 18, further comprising:
identifying information associated with the fault condition based at least in part on identifying the fault condition, wherein the message comprises one or more bits that indicate the information associated with the fault condition.

22. The method of claim 21, wherein the information associated with the fault condition comprises a time at which the fault condition occurred, a duration of the fault condition, a temperature of the memory system, or a combination thereof.

23. The method of claim 18, further comprising:
identifying a time-out condition based at least in part on identifying the fault condition, wherein transmitting the message is based at least in part on identifying the time-out condition.

* * * * *